Figure 1:
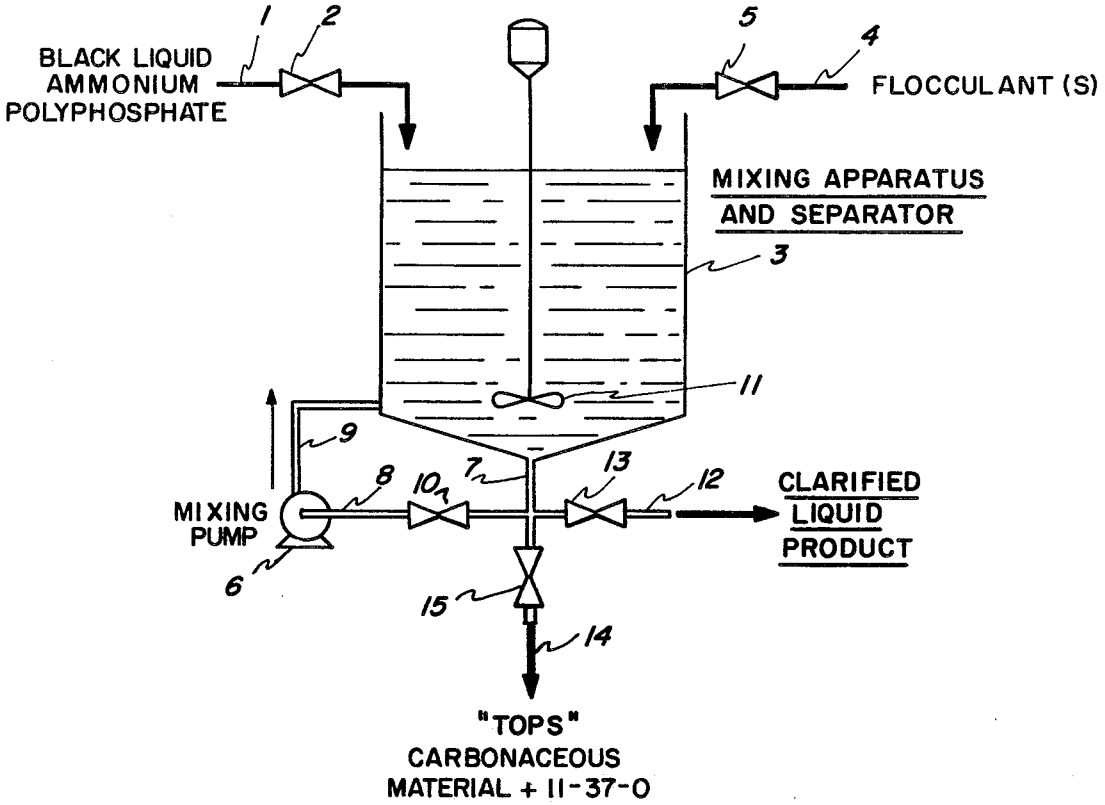
Figure 2:
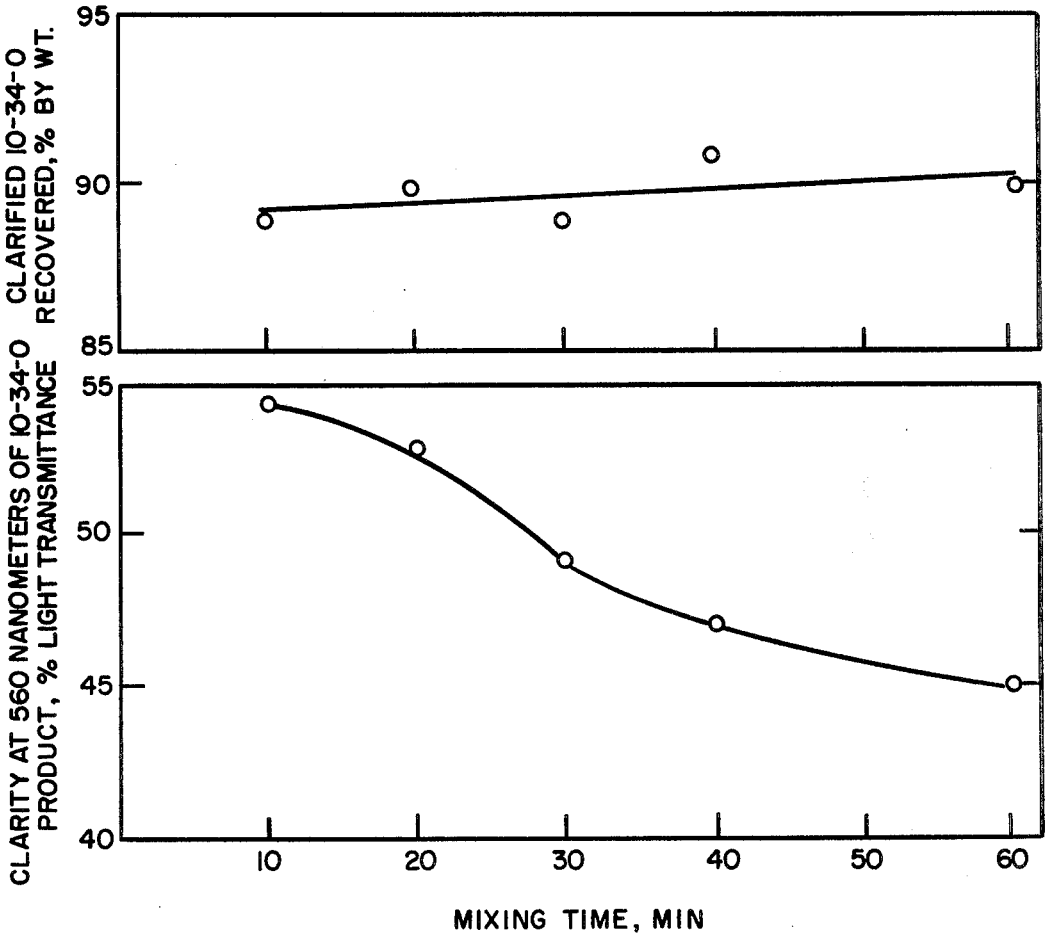

United States Defensive Publication [19] (H) [11] T986,010

McGill et al. [43] Sep. 4, 1979

[54] SIMPLIFIED BATCH CLARIFICATION OF LIQUID AMMONIUM POLYPHOSPHATE

[75] Inventors: Kenneth E. McGill, Sheffield, Ala.; Eugene B. Wright, Jr., Lawrenceburg, Tenn.

[73] Assignee: Tennessee Valley Authority

[21] Appl. No.: 949,723

[22] Filed: Oct. 10, 1978

[51] Int. Cl.[2] ..... C01B 15/16; C01B 25/26

[52] U.S. Cl. ..... 423/305; 423/321 S; 71/43

[57] ABSTRACT

Particulate carbonaceous matter in ammonium polyphosphate liquid made from impure wet-process phosphoric acid is removed batchwise by intimately mixing the liquid with a combination of selected organic flocculating agents and then allowing the mixture to separate. The particulate carbonaceous matter floats rapidly to the surface and the clarified liquid that contains essentially no particulate carbonaceous matter is withdrawn from the bottom of the separation vessel. The particulate carbonaceous matter, a minor portion of the input ammonium polyphosphate liquid, and the flocculating agents are then intimately remixed with an additional fresh charge of black ammonium polyphosphate liquid to allow reuse of flocculant not combined with the particulate carbon material in the original charge. This reuse of flocculant may be repeated as many as five times. After the flocculant is inactive, the carbonaceous matter, the inactive flocculant, and a minor portion of the input ammonium polyphosphate liquid are then withdrawn and processed into fluid or solid fertilizers. In some instances, more flocculant is added to the mixing vessel.

16 Claims, 2 Sheets Drawing,

33 Pages Specification

The file of this unexamined application may be inspected and copies thereof may be purchased (849 O.G. 1221, Apr. 9, 1968).

NOTE: MIXING PROVIDED BY A MIXING PUMP (SEMIOPEN IMPELLER; 360 GPM MAX.; TIP SPEED 105 FT./SEC.) AND AGITATOR (14-IN. DIAMETER, TIP SPEED 30 FT./SEC.)